United States Patent [19]

Heppner et al.

[11] Patent Number: 5,566,195
[45] Date of Patent: Oct. 15, 1996

[54] INTRACAVITY RAMAN LASER

[75] Inventors: Joachim Heppner; Willibald Appt, both of Oberkochen; Ralf Peter, Aalen, all of Germany

[73] Assignee: Carl-Zeiss-Stiftung, Heidenheim, Germany

[21] Appl. No.: 493,287

[22] Filed: Jun. 21, 1995

[30] Foreign Application Priority Data

Jul. 2, 1994 [DE] Germany .......................... 44 23 308.6

[51] Int. Cl.$^6$ .......................................................... H01S 3/30
[52] U.S. Cl. ...................................................................... 372/3
[58] Field of Search .......................... 372/3, 59; 356/301

[56] References Cited

U.S. PATENT DOCUMENTS

| | | | |
|---|---|---|---|
| 4,194,170 | 3/1980 | Kurnit | 372/3 |
| 4,648,714 | 3/1987 | Benner et al. | 356/301 |
| 4,868,833 | 9/1989 | Stultz et al. | 372/3 |
| 4,933,943 | 6/1990 | Narhi et al. | 372/3 |
| 5,180,378 | 1/1993 | Kung | 372/59 |
| 5,251,221 | 10/1993 | Stultz et al. | 372/3 |

FOREIGN PATENT DOCUMENTS

| | | |
|---|---|---|
| 3810306 | 10/1989 | Germany . |
| 4111835 | 10/1992 | Germany . |
| 2256082 | 11/1992 | United Kingdom . |
| WO89/03131 | 4/1989 | WIPO . |

OTHER PUBLICATIONS

"Stimulated Raman scattering at kHz pulse repetition rates" by E. O. Amman et al, Applied Physics Letters, vol. 27, No. 12, Dec. 1975, pp. 662 to 664.

"Experimental investigation of intracavity stimulated Raman scattering conversion of ultrashort pulses in an actively mode–locked laser" by A. S. Grabchikov et al, Soviet Journal of Quantum Electronics, vol. 15, No. 11, Nov. 1985, Woodbury, New York, pp. 1559 to 1561.

"A Kilohertz Repetition Rate 1.9 μm $H_2$ Raman Oscillator" by B. Stewart et al, IEEE Journal of Quantum Electronics, vol. 25, No. 10, Oct. 1989, pp. 2142 to 2148.

*Primary Examiner*—Leon Scott, Jr.
*Attorney, Agent, or Firm*—Walter Ottesen

[57] ABSTRACT

The invention is directed to an intracavity Raman laser with a collimated beam path in the Raman medium 10. The intracavity Raman laser includes a single-mode Stokes resonator, a mode stop 13, a telescope 3 for adapting the laser rod 20, a single mode also for the pump laser and a deflecting mirror system 4 for a more compact arrangement. The mode volumes of the pump laser and the Stokes resonator are matched.

13 Claims, 1 Drawing Sheet

INTRACAVITY RAMAN LASER

FIELD OF THE INVENTION

The invention relates to an intracavity Raman laser having a collimated beam path in the Raman medium.

BACKGROUND OF THE INVENTION

A laser of this type is known from the article "Stimulated Raman Scattering at kHz pulse repetition rates" by E. O. Amman et al, Applied Physics Letters, Vol. 27, No. 12, December 1975, pages 662 to 664.

A Raman medium is positioned between two planar mirrors which form the Stokes resonator. One of these mirrors also acts as a resonator mirror of the pump laser which comprises an arc lamp pumped solid-state laser, an active Q-switch and a further planar mirror. The above article discloses that the solid-state laser typically operates in a low-order transverse mode. Nothing is said about the modes of the Stokes resonator.

As a rule, Raman lasers are configured in such a way that they have a focus in the Raman cell, since the essential nonlinear processes are dependent to a disproportionately high degree on the power density of the pumping light. Thus, this procedure results in lasers with high output powers and high efficiency.

Known Raman lasers are configured as multimode lasers. Multimode lasers display a much more pronounced beam divergence than single-mode lasers. The divergence of a single-mode laser is of the order of magnitude of lambda/D, the ratio of the wavelength to the diameter of the beam at the waist of the Gaussian beam. Compared to the divergence of the single-mode laser, the divergence of a multimode laser beam can be several times higher. In conventional Raman laser systems, the Stokes beam divergence typically is 10× larger than the divergence of a diffraction-limited beam. A further serious drawback of multimode lasers is the non-Gaussian beam profile inside the laser resonator. The mixture of many transverse modes in the resonator results in localized hot spots on the laser optics and therefore contributes to laser-induced destruction of the optical system.

An example of such a known intracavity Raman laser is described in U.S. Pat. No. 4,868,833.

SUMMARY OF THE INVENTION

It is the object of the invention to provide an intracavity Raman laser with high beam quality, that is, low divergence and good focusability, which combines safe and reliable operation with a simple design and good efficiency.

This object is achieved by the intracavity Raman laser of the invention which includes: a pump laser for establishing a pump laser beam; the pump laser including a pump laser medium and two pump laser resonator mirrors conjointly defining a pump laser resonator; a Stokes resonator for establishing a single mode Stokes light beam; the Stokes resonator including a Raman cell and two Stokes resonator mirrors; the Stokes resonator being contained within the pump laser; and, the pump laser beam and the Stokes light beam being collimated within the Stokes resonator.

A telescope in the beam path allows for the optimal adaptation of the light bundle cross sections in the Raman medium and in the pump laser, resulting in the optimal utilization of the optically pumped amplification volume in the pump laser.

Special advantages are obtained if the pump laser is also designed for monomode operation in the manner of the Stokes resonator. In this case, the volume pumped inside the Raman cell is optimally adapted to the mode volume of the Stokes resonator, especially if the same mode stop acts simultaneously on the Stokes resonator and the pump laser. This combines a simple design involving a low number of components with stable, high-efficiency operation and a Gaussian beam profile for optimal focusability. A preferred embodiment uses a mirror common to both resonators which decouples the Raman-shifted light.

BRIEF DESCRIPTION OF THE DRAWINGS

The invention is now described with reference to the drawings wherein.

DESCRIPTION OF THE PREFERRED EMBODIMENTS OF THE INVENTION

Figure 1:
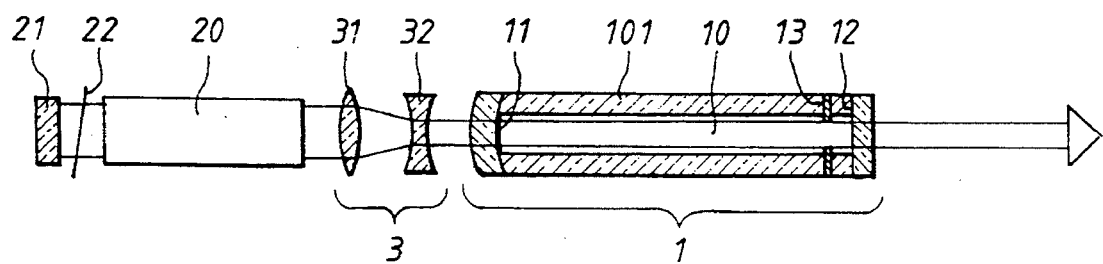
FIG. 1 is a schematic of an embodiment of the intracavity Raman laser according to the invention; and, FIG. 2 is a schematic of an embodiment of the intracavity Raman laser modified to include a deflecting mirror system.

The Stokes resonator 1 of the embodiment shown in FIG. 1 contains a Raman medium 10, for example, methane gas, deuterium or hydrogen, in a tube 101 which is closed off by the resonator mirrors 11 and 12. The resonator mirror 11 is concave and has a radius of 3 m ensuring that the Stokes resonator 1 becomes stable. The rearward surface of the transparent blank of the resonator mirror 11 is convex and has the same radius, ensuring that the pumping light is not refracted. The resonator mirror 11 transmits the pumping light and is provided with a dichroic coating to ensure maximum reflection of the Stokes radiation. The resonator mirror 12 is the decoupling mirror for the Stokes radiation and is coated for maximum reflection of the pumping light. The resonator mirror has a reflectivity of 0.7±0.2 for the Stokes radiation. The mode stop 13 can be applied directly on the mirror 12 in the form of an absorbing layer with an aperture in its center. The mode stop can, however, also be configured as a separate component and positioned near the resonator mirror 12.

The laser rod 20 is, for example, made of Nd:YAG, and has planar, anti-reflection coated end faces. The laser rod 20, the mirror 21 (planar, totally reflecting), the above-mentioned resonator mirror 12 and the passive Q-switch film 22 with a saturable absorber form the pump laser which is itself pumped by a gas discharge lamp (not shown) or is pumped in another known manner.

A Galilean telescope 3 comprises the convex lens 31 (f=60 mm) and, at a spacing of 30 mm therefrom, the concave lens 32 (f=−30 mm ). This telescope 3 causes a reduction of the beam radius from 1 mm in the laser rod 20 to 0.5 mm in the Raman medium 10 and thus a quadrupling of the power density.

At the same time, this beam radius corresponds to the beam radius of the $TEM_{00}$ mode of the Stokes resonator 1 having the dimensions specified above. This ensures optimum adaptation of the volume of the Raman medium 10 pumped by the pump laser to the fundamental mode of the Stokes resonator 1, resulting in optimum efficiency. This arrangement ensures at the same time that the mode stop 13 also acts as a $TEM_{00}$ mode stop for the pump laser.

In this way, it is ensured that the pump laser only oscillates in the $TEM_{00}$ mode adapted best for the Raman conversion and that no power is channeled off to other modes.

The radius of the mode stop 13 is 1.5 mm and is thus markedly larger than the radius of the TEM$_{00}$ beam (0.5 mm). This ensures that the low-power periphery of the beam remains unimpaired and that no interfering diffraction or attenuation of the TEM$_{00}$ mode occurs. On the other hand, the most intensive zones of the higher modes are effectively suppressed.

The length of the laser rod 20 is 50 mm, the overall resonator length between the mirrors 21 and 12 is 220 mm.

Figure 2:
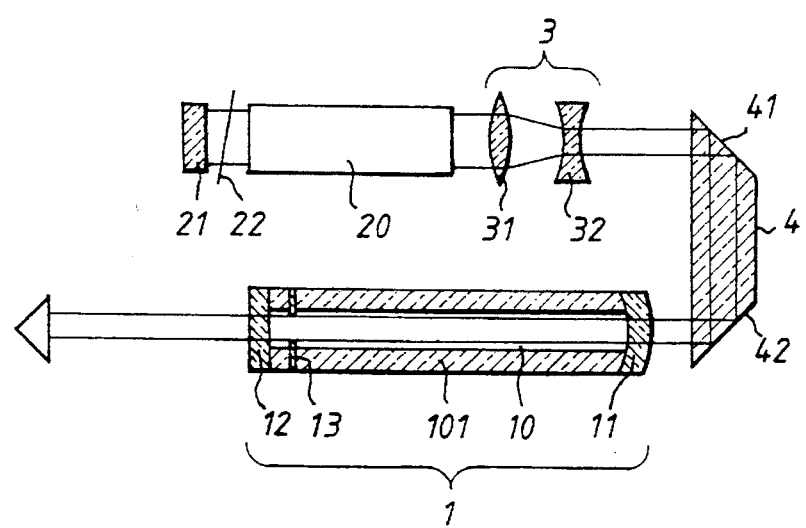

FIG. 2 shows a modification of the intracavity Raman laser with a shorter design length. A deflecting mirror system 4 is positioned between the telescope 3 and the Stokes resonator 1. This system 4 comprises a prism having two deflecting mirrors 41 and 42. This arrangement folds the beam path and reduces the length of the system by approximately one half. This is advantageous for accommodating the system and for providing a stable assembly thereof. The quality of the resonator of the pump laser (20, 21, 12) can be optimized by a precision adjustment of the positions of the lens elements (31, 32) of the telescope 3. This permits any thermal lens effects of the laser rod 20 to be corrected.

The interaction of the collimated beam in the Stokes resonator 1 with the monomode operation, especially in the TEM$_{00}$ mode, results in an output beam with very well defined, stable properties and good focusability along with an interference-proof design and good efficiency. The efficiency is further improved by the measures taken to select the modes and to adapt the pump laser (20, 21, 12).

The dimensions and active media (10, 20) relate to one embodiment. Personnel working in this area can easily modify the system using different media and dimensions.

It is understood that the foregoing description is that of the preferred embodiments of the invention and that various changes and modifications may be made thereto without departing from the spirit and scope of the invention as defined in the appended claims.

What is claimed is:

1. An intracavity Raman laser comprising:

a pump laser for establishing a pump laser beam;

said pump laser including a pump laser medium and two pump laser resonator mirrors conjointly defining a pump laser resonator;

a Stokes resonator for establishing a single mode Stokes light beam;

said Stokes resonator including a Raman cell and two Stokes resonator mirrors;

said Stokes resonator being contained within said pump laser; and, said pump laser beam and said Stokes light beam being collimated within said Stokes resonator.

2. The intracavity Raman laser of claim 1, said Stokes resonator being configured as a TEM$_{00}$ resonator.

3. The intracavity Raman laser of claim 2, said Stokes resonator including a mode stop.

4. The intracavity Raman laser of claim 3, said Stokes resonator including a concave Stokes resonator mirror and a planar Stokes resonator mirror.

5. The intracavity Raman laser of claim 4, said mode stop being arranged on said planar resonator mirror.

6. The intracavity Raman laser of claim 4, said planar Stokes resonator mirror defining one of said laser resonator mirrors.

7. The intracavity Raman laser of claim 1, said pump laser including a telescope interposed between said pump laser medium and said Stokes resonator for expanding the beam of light inside said pump laser medium.

8. The intracavity Raman laser of claim 1, further comprising a deflecting mirror optic arrangement interposed between said pump laser medium and said Stokes resonator.

9. The intracavity Raman laser of claim 1, said pump laser resonator being configured as a single-mode resonator.

10. The intracavity Raman laser of claim 9, said pump laser resonator being configured as a TEM$_{00}$ laser.

11. The intracavity Raman laser of claim 9, said pump laser resonator having a mode stop and said mode stop of said Stokes resonator defining said mode stop of said pump laser resonator.

12. The intracavity Raman laser of claim 1, said laser beam being limited to a cross section of said Stokes light beam inside said Stokes resonator.

13. The intracavity Raman laser of claim 1, one of said pump laser resonator mirrors is also one of said Stokes resonator mirrors and serves as an out coupling mirror of the Stokes resonator.

* * * * *